UNITED STATES PATENT OFFICE.

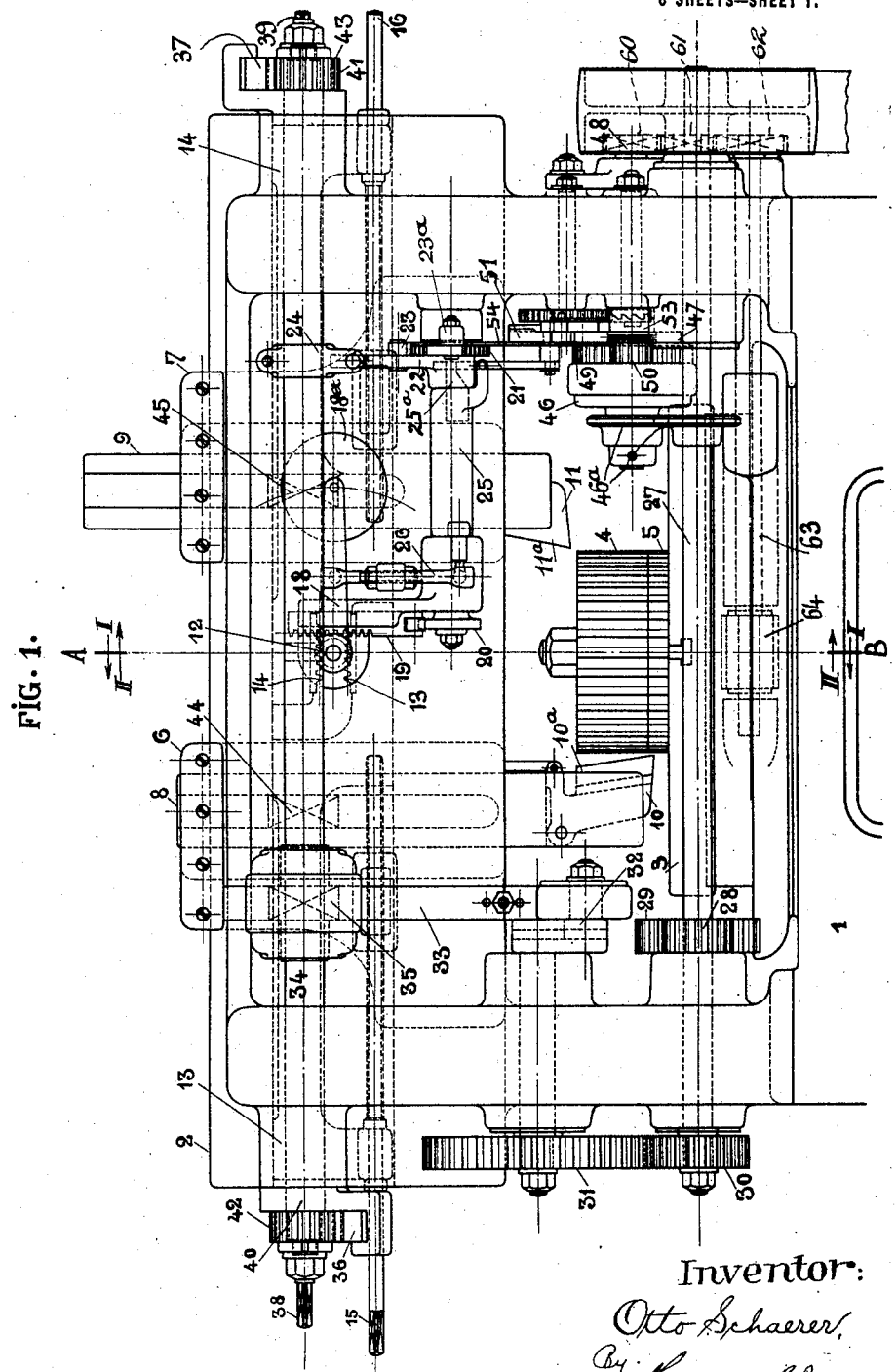

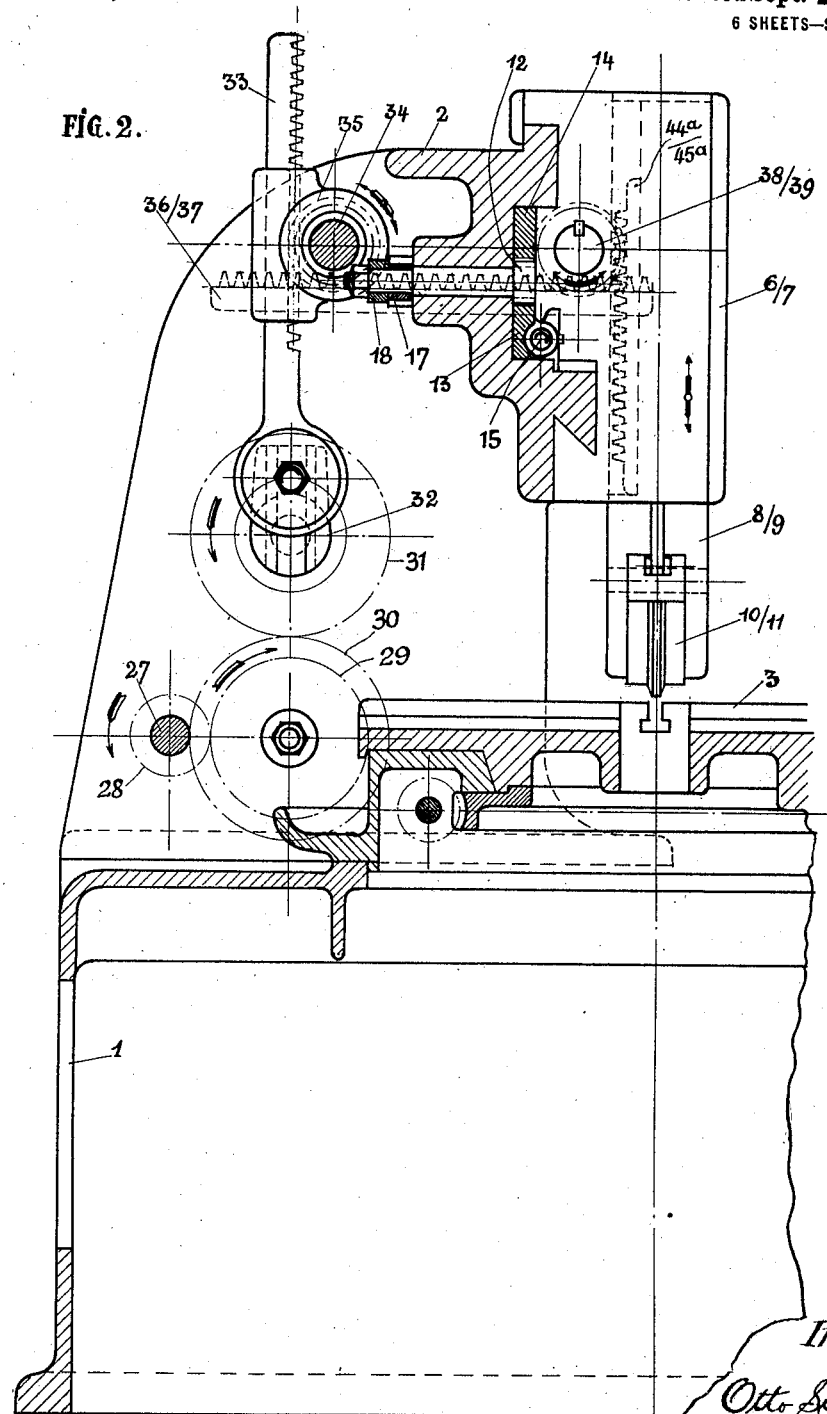

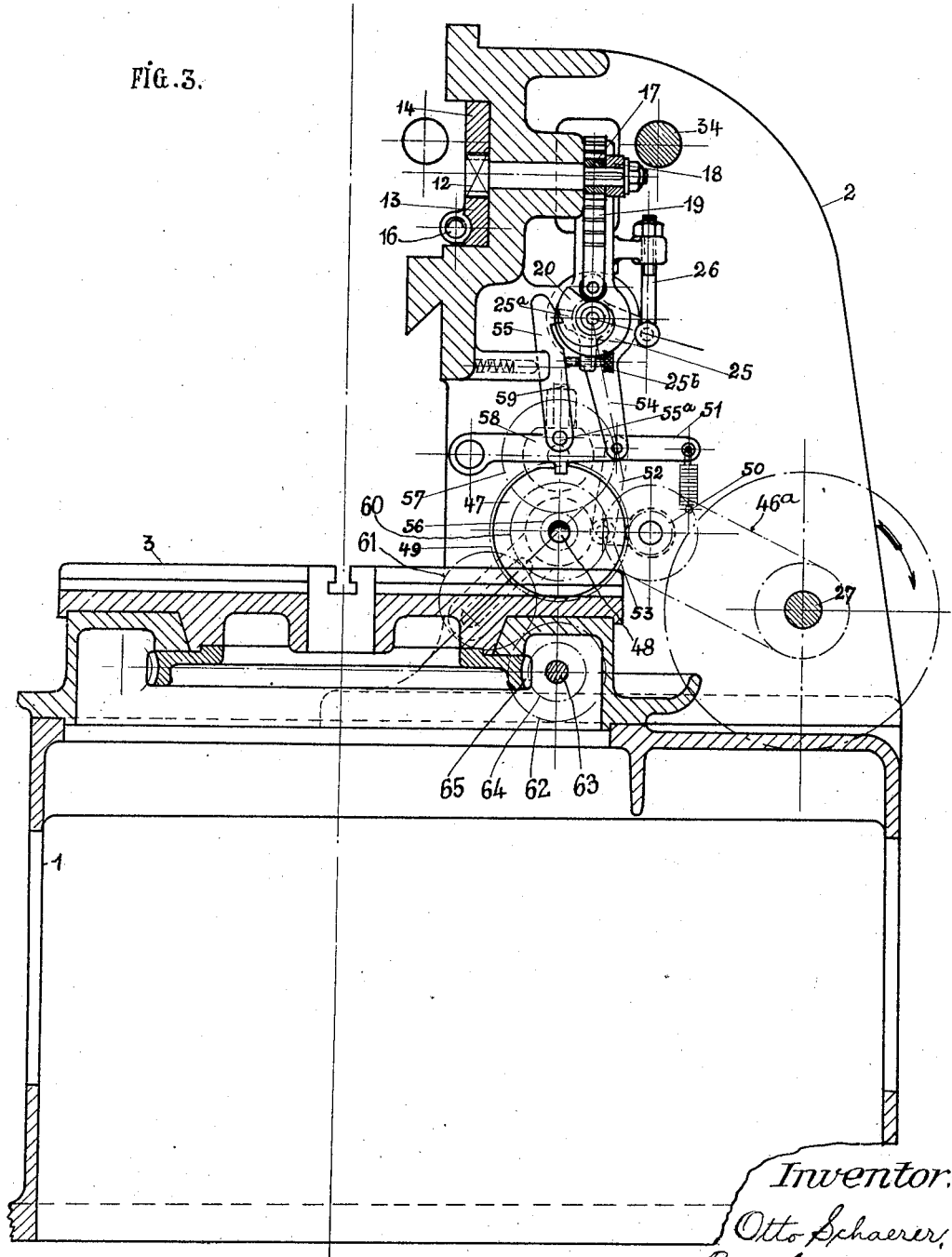

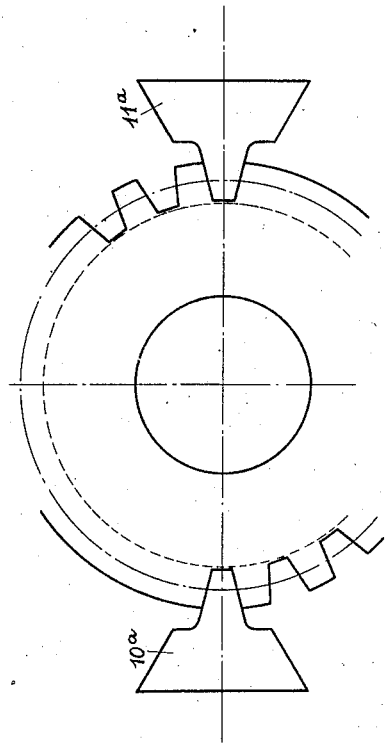
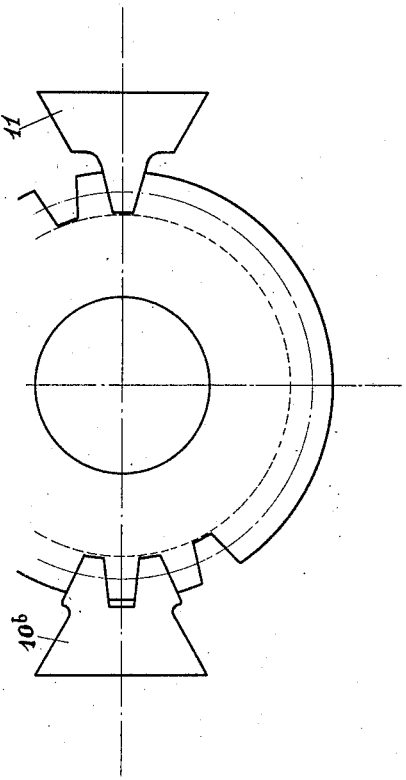
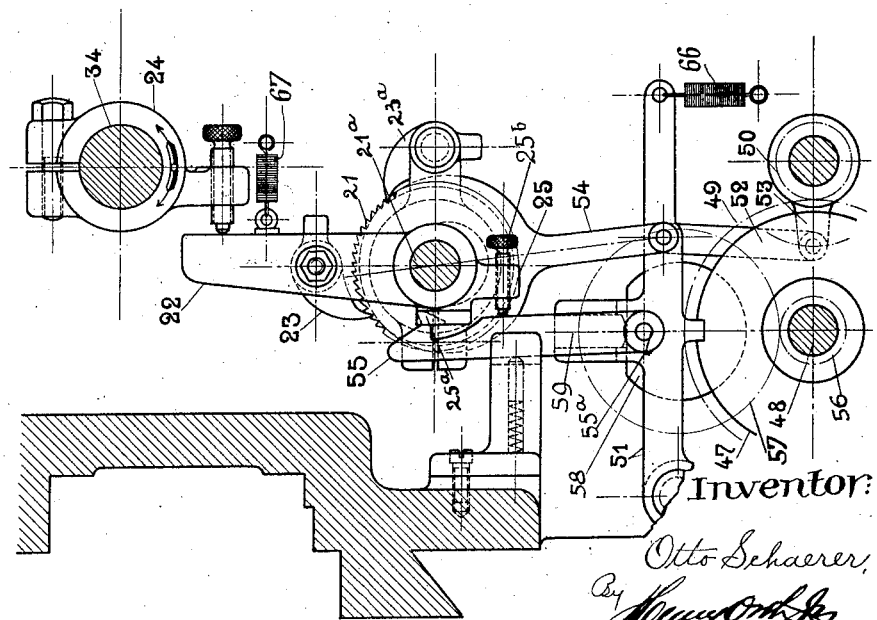

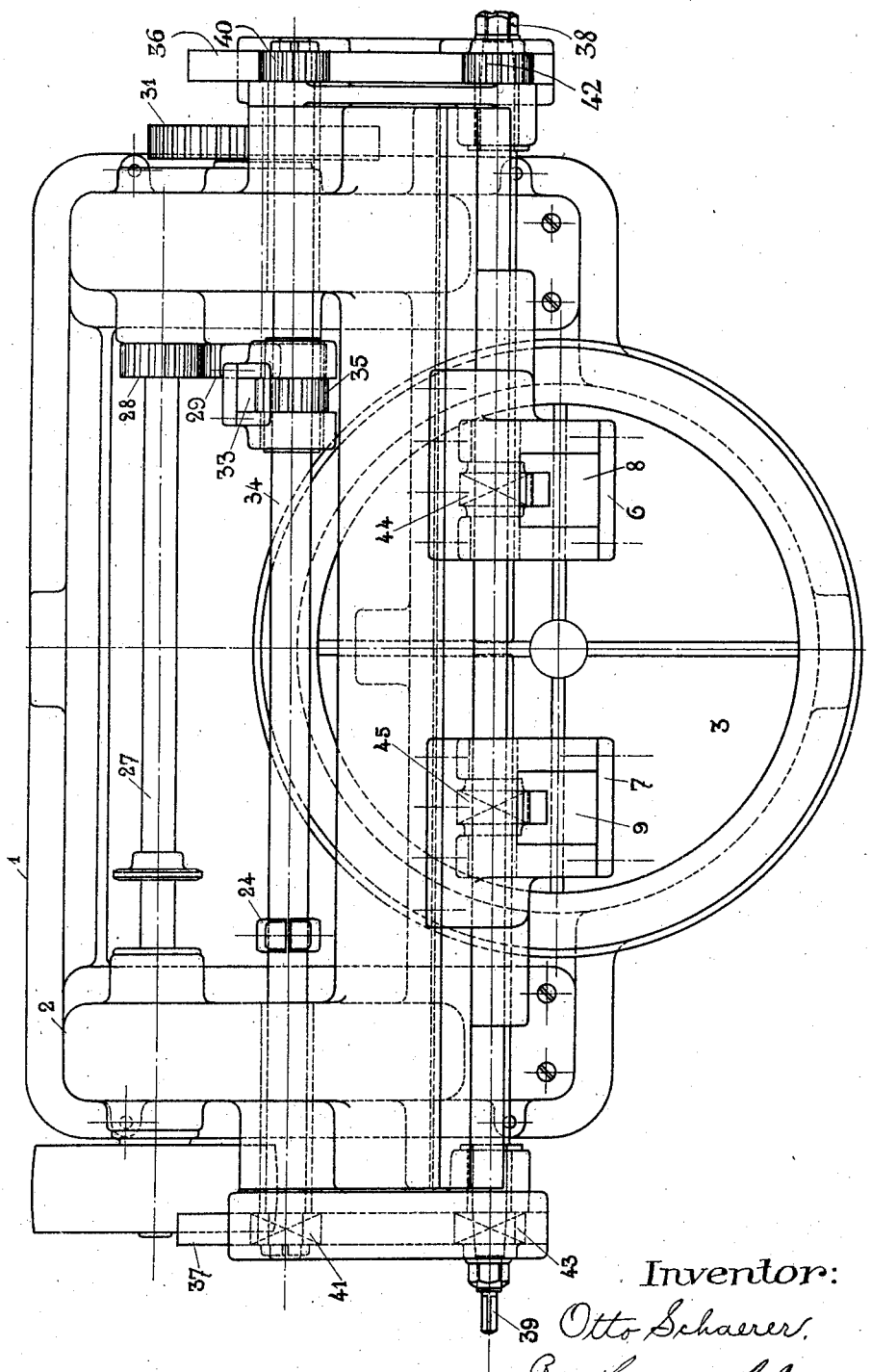

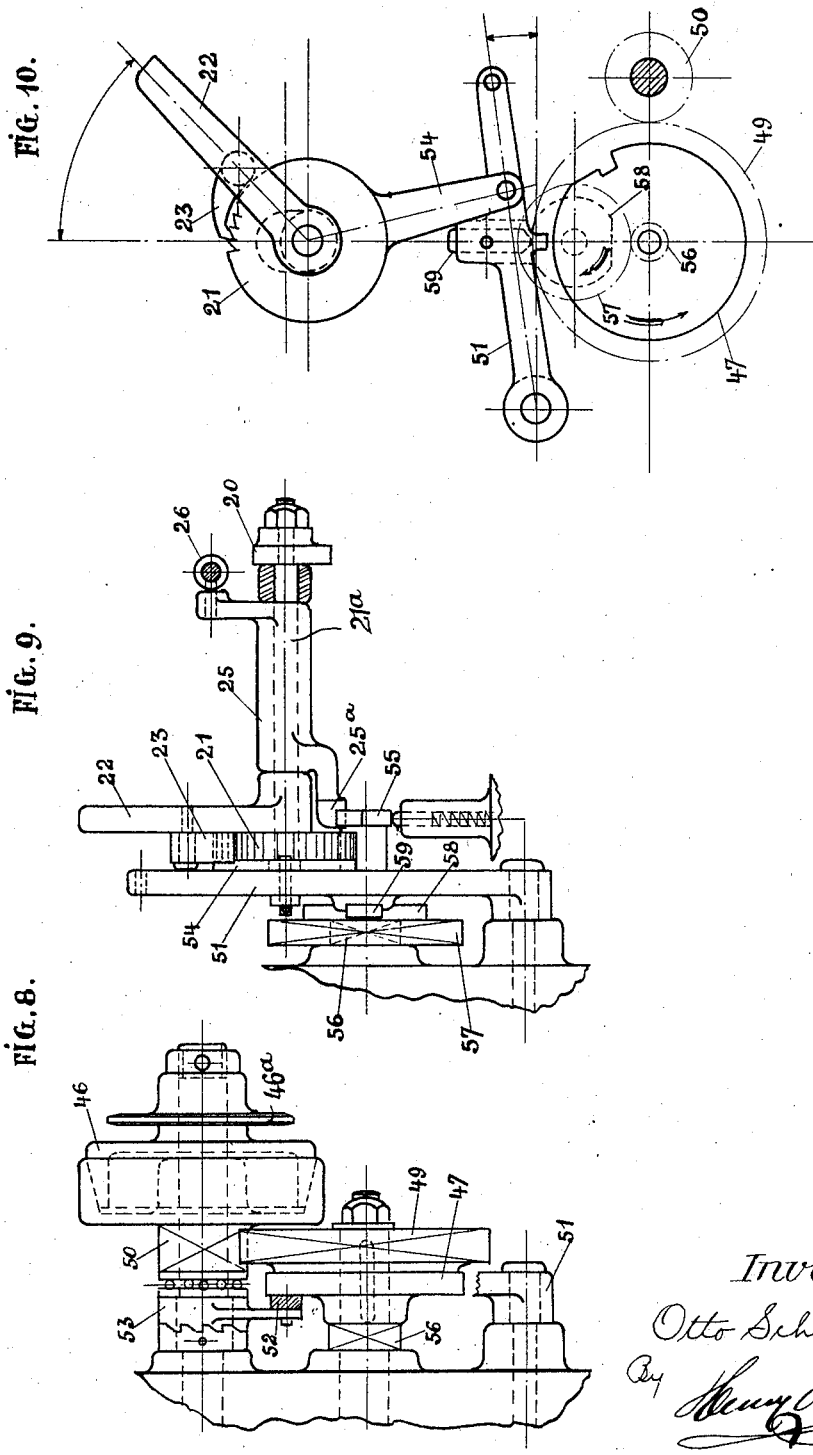

OTTO SCHAERER, OF BASEL, SWITZERLAND.

GEAR-SLOTTING MACHINE.

1,392,226.                     Specification of Letters Patent.     Patented Sept. 27, 1921.

Application filed June 29, 1920. Serial No. 392,675.

*To all whom it may concern:*

Be it known that I, OTTO SCHAERER, a citizen of the Republic of Switzerland, residing at Friedensgasse 64, Basel, Switzerland, have invented certain new and useful Improvements in Gear-Slotting Machines; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to improvements in gear slotting machines. The hitherto known gear slotting machines work with but a single tool, and they perform after each working stroke an idle movement; thus their output is small and an unequal consumption of the motive force imparted to the machine results therefrom. Further the known slotting machines show more or less complicated operative motions and tools which features tend to increase further the costs of producing gear wheels.

The present invention relates to a double acting gear slotting machine which is mainly intended for "roughing" the teeth of gear wheels, the "finishing" of the teeth is done on special machines such as the Fellows shaper which is particularly suited for that kind of work. A division in the production of gear wheels is thus made possible by the machine according to the invention, the hitherto known method of roughing and finishing gearing on the same machine has not proved satisfactory.

This double acting gear slotting machine utilizes fully the working stroke by having two tools and ram guides one of which is performing useful work while the other is performing its return stroke. In this way the output of the machine while consuming approximately the same amount of energy as the heretofore used machine is practically doubled and the consumption of the driving power is uniform as this type of slotting machine works continuously like a machine with a rotary tool. Obviously such a machine may be arranged so that both slotting tools work and return simultaneously by simple means.

Another feature of the machine consists in the fact, that both tools cut the blank evenly and positively and return into their initial position in the same manner after having performed their working strokes. A simple and ingenious device prevents the dividing device coming into operation until after the two tool slides have returned into their initial position. The same device causes in a positive manner the dividing device to actuate whereby any failing of same is precluded. Further another simple arrangement prevents any feed motion of the tools until after the dividing device has finished its operation.

The use of a hardened die which is placed below the blank enables a further increase of the output of the machine, as the feed motion can be correspondingly increased without having to fear that the teeth break off when the tool runs off the edge of the blank. The use of such a die when slotting gear wheels has not been known up to the present and its use is very advantageous whenever wheels of the same size have to be produced in great numbers.

For producing gear wheels with an uneven number of teeth the two tools are of different shape, so that the one is producing the space between two teeth, while the other is producing both blanks of a tooth. This arrangement simplifies the construction of the tool holder, which, without it, would have to be arranged displaceable in a lateral direction and turnable. Further the adjustment of the tools is very much simplified.

An exemplification of the invention is shown on the accompanying drawings in which:

Figure 1 is a rear view of the machine.

Fig. 2 is a vertical section along line A—B of Fig. 1 seen in the direction of arrow I.

Fig. 3 is a vertical section along line A—B of Fig. 1 seen in the direction of arrow II.

Fig. 4 illustrates the dividing mechanism.

Fig. 5 shows in a diagrammatic manner the shape of the two slotting tools for producing gear wheels with an even number of teeth;

Fig. 6 is a diagrammatic sketch illustrating the shape of the two slotting tools for producing gear wheels with an uneven number of teeth;

Fig. 7 is a plan view of the machine.

Fig. 8 is a fragmentary plan view of the dividing mechanism.

Fig. 9 is a plan view of the feed and release device for the dividing mechanism.

Fig. 10 is an elevation of the feed and release device shown in Fig. 9, several parts being left off.

To the underframe 1 is rigidly secured a frame in the shape of a yoke 2 which is adapted to act as a horizontal guide for the slides 6 and 7. 3 denotes a circular table actuated by a worm gear 64, 65 for holding a blank 4 and a hardened die 5 placed below the blank. 6 and 7 are slides adapted to take up rams 8 and 9 on which the hinged plates 10 and 11 are supported. A pinion 12 (Figs. 1-3) rotatably mounted on the yoke is in engagement with the toothed racks 13 and 14. Two screw threaded spindles 15 and 16 are mounted in these racks and engage the two slides 6 and 7 respectively. Upon the axle of pinion 12 another pinion 17 and a lever 18 is fixed. A toothed rack 19 is in engagement with pinion 17, to which rack motion is imparted by a cam 20. To a ratchet wheel 21, mounted on the same shaft 21$^a$ to the other end of which the eccentric 20 is secured, an intermitting motion is imparted by means of lever 22, pawl 23 and the oscillating lever 24 (see Figs. 1 and 4). Pawl 23$^a$ prevents the turning back of ratchet wheel 21. The sleeve 25 which is provided at its ends with projecting parts, is further provided with a shoulder 25$^a$ and is connected by a longitudinally adjustable link 26 to lever 18. The rotary movement of the driving shaft 27, Fig. 2, is transmitted by gear wheels 28, 29, 30, 31 to an adjustable crank 32. 33 denotes a toothed rack which co-acts with a pinion 35 secured to shaft 34. 36 and 37 are racks which engage with the wheels 40, 41, 42, 43 respectively (Fig. 7) fixed on the shafts 34, 38 and 39 respectively. The two pinions 44 and 45 which are displaceably mounted on the shafts 38, 39 respectively co-act with racks 44$^a$ and 45$^a$ inserted in the rams 8 and 9. A friction device 46 is operatively connected to shaft 27 by means of a chain drive 46$^a$. A dividing disk 47 is firmly secured to the change gear shaft 48 and is driven by wheels 49, 50. The stop lever 51 (Figs. 3, 4) is linked by 52 to a jaw coupling 53. 54 denotes a lever to influence the movements of pawl 23. The rocking lever 55 is at 55$^a$ fulcrum connected to lever 51 and is actuated by means of the shoulder 25$^a$ provided at the sleeve 25. 56 (Figs. 4 and 10) denotes a wheel that is rigidly connected to the wheel 49 and to the dividing disk 47 and is in engagement with the wheel 57 that is rigidly connected with cam disk 58. 59 is a finger attached to lever 51.

The operation of the described machine is as follows:

The driving shaft 27 actuates through the interposition of wheels 28, 29 and change wheels 30, 31 the adjustable crank 32, which imparts a reciprocating motion to the vertical rack 33. The pinion 35, co-acting with said rack imparts an oscillating movement to shaft 34, which movement is transmitted by means of the two pinions 40, 41, the racks 36, 37 and the pinions 42, 43 to the shafts 38, 39. The arrangement of the racks 36, 37 above or below the shafts 34, 38, 39 insures that the shaft 38 turns clockwise while the shaft 39 turns anticlockwise or vice versa, so that one of the tools is always working, whereby the driving power is equally distributed and consumed. If the racks 36, 37 are arranged both above or below the wheels 40—43 respectively the machine works simultaneously with both tools instead of alternately.

The two pinions 44, 45 mounted displaceably on the shafts 28, 29 respectively engage the racks fixed to the rams 8, 9 and impart the operating motion to the latter. The slides 6, 7 containing the tools are connected by means of the screw threaded spindles 15, 16 to the racks 13, 14 which glide in a recess of the yoke 2 and the tools are moved toward the blank and touch the blank when rack 19 rests on the point of the cam 20 nearest to its axis. In this position the tool slides 6 and 7 are in their outer position. A special cam 20 of a suitable eccentricity is used for every kind of toothing so that upon one complete rotation of the eccentric the two tool slides with the tools are advanced toward each other by an amount corresponding to the depth of the tooth. As soon as this eccentric is rotated beyond the position in which its highest point is in the vertical the lever 18 is actuated by its weight 18$^a$ and brings the tool slides 6, 7 into their outer positions by turning pinion 12, and further the lever 18 brings the rack 19 onto the lowest point of the cam 20. During this operation rotation is imparted to the sleeve 25, which is provided with projecting parts and is rotatably mounted on shaft 21$^a$, by means of link 26 connecting said sleeve to the lever 18, the rocking lever 55 connected at 55$^a$ to the stop lever 51 is at the same time lifted by means of the shoulder 25$^a$ provided on the projecting part of the sleeve 25, whereupon the thumb screw 25$^b$ (Figs. 3, 4) arranged on the same projecting part presses in consequence of the rotation of the sleeve 25 the lever 55 out of engagement with the shoulder 25$^a$. The screw 25$^b$ is so adjusted that lever 55 is pressed out of engagement with the shoulder after lever 51 has been lifted out of the notch provided in the dividing disk. In consequence of the lifting motion of stop lever 51 the jaw coupling part 53 is turned as the latter is linked to lever 51, this turning action causes on account of the slope of the teeth of the jaw coupling the friction disk connected to wheel 50 to be pressed against the continuously rotating part 46 of the friction device, whereby the wheel 49

(Figs. 3, 4), which is in engagement with the wheel 50 and is connected to the dividing disk 47, is caused to rotate until lever 51 comes by the action of spring 66 again into engagement with the notch on the dividing disk, whereupon the part 53 of the jaw coupling is brought back into its initial position and the friction device is brought out of action. The motion of the dividing disk is transmitted by means of gear wheels 60, 61 and 62 to the shaft 63, on which the worm 64 engaging the worm wheel 65 fitted to the circular table is mounted. The ratios are determined so that upon each action of the dividing mechanism the circular table is turned by an angular amount corresponding to the pitch of the teeth of the wheel to be produced. Upon the lifting of the weight loaded lever 18 caused by the cam 20 the sleeve 25 is again caused to rotate by link 26, the shoulder 25$^a$ intersects the lever 55 which is pressed against the former by means of a spring as soon as the sleeve 25 and lever 18 have reached the highest position and the shoulder 25$^a$ the lowest position.

In order to obtain better ratios for the wheels operating the dividing device the change gear shaft 48 is fitted with a pinion 56 which co-acts with a gear wheel 57 rigidly fixed to a cam disk 58. The lever 51 is provided with a finger 59, which glides on the cam disk and is so adjusted that the lever 51 is kept lifted at such a height during the dividing operation that the latter is out of engagement with the notch provided in the dividing disk and that the jaw coupling part 53 is pressing the friction disk sufficiently against the rotating part of the friction device so that the dividing device is kept in rotation. The ratio of the wheels 56, 57 is usually chosen to be 1:3, so that dividing disk is allowed to perform three complete rotations until lever 51 comes into engagement with the notch which takes place as soon as the finger 59 is brought to rest on the face of the cam disk 58. The feed motion of the tool is performed by the ratchet wheel 21, the lever 22 loaded by a spring 67 and the pawl 23. At each working stroke the lever 24 mounted on the oscillating shaft 34 imparts a movement to the lever 22 which can be limited by means of a set screw fixed to the lever 24. In order to prevent the feed motion for the working movement from starting before the dividing operation is finished, a safety lever 54 is connected to the stop lever 51 which is lifted together with the stop lever 51 when the dividing motion is performed whereby the pawl 23 is held out of engagement with the ratchet wheel until after the safety lever 54 and the stop lever 51 are lowered again and engage with the notch in the dividing disk when the dividing operation is finished.

To this end the lever 54 is formed at its upper end as a disk of the same diameter as the ratchet wheel, so that the pawl which is broader than the ratchet wheel, glides along the circumference of the disk-shaped part of the lifted lever 54 and is thereby kept out of engagement with the teeth of the ratchet wheel. The pawl 23$^a$ which is mounted on a fixed bracket prevents any turning back of the ratchet wheel.

In order to reach the highest possible output with such a machine, the blank is placed above a hardened die 5 shaped in accordance with the number and shape of teeth of the wheel to be produced; by this arrangement the breaking off of the teeth at the lower edge of the blank, which occurs with nearly every slotting method, is prevented.

The hinged tool holders 10, 11 take up the tools 10$^a$, 11$^a$, 11$^b$ (Figs. 1, 5, 6). The former are lifted off the blank in a known manner at each return stroke.

To produce gear wheels with an even number of teeth the two tools 10$^a$ and 11$^a$ shown in Fig. 5 are used. When producing gear wheels with an uneven number of teeth besides the tool 11 a tool 10$^b$ is used of the shape shown in Fig. 6 which incloses the tooth and which can be fixed in an ordinary hinged tool holder.

I claim:

1. In a gear slotting machine, the combination of a rotary table adapted to hold the blank co-axially to the table, two tool rams arranged diametrically opposite the blank, a driving-shaft, and means to convert the rotary motion of the driving shaft into a reciprocating motion of the tool rams and to actuate the latter alternately, so that one ram performs its working stroke while the other performs its return stroke.

2. In a gear slotting machine, the combination of a rotary table adapted to hold the blank coaxially to the table, two tool rams arranged diametrically opposite each other with regard to the axis of the blank, a driving shaft, means to convert the rotary motion of the driving shaft into a reciprocating motion of the tool rams and to actuate same alternately so that one ram is performing its working stroke while the other is performing its return stroke whereby a uniform consumption of power is attained, and a feed mechanism for imparting to each tool ram a uniform feed motion in a radial direction with regard to the blank.

3. In a gear slotting machine, the combination of a rotary table adapted to hold the blank coaxially to the table, two tool rams arranged diametrically opposite each other with regard to the axis of the blank, a driving shaft, means to convert the rotary motion of the driving shaft into a reciprocating motion of the tool rams and to actuate same alternately so that one ram is performing its working stroke while the other is performing its return stroke, whereby a uniform consumption of power is attained, and a feed mechanism for imparting to each tool ram a uniform feed motion in a radial direction with regard to the blank, and a dividing device for automatically turning the rotary table together with the blank around its axis by an angular amount corresponding to the pitch of the teeth produced.

4. In a gear slotting machine, the combination of a rotary table adapted to hold the blank coaxially to the table, two tool rams arranged diametrically opposite each other with regard to the axis of the blank, a driving shaft, means to convert the rotary motion of the driving shaft into a reciprocating motion of said tool rams and to actuate same alternately so that one ram is performing its working stroke while the other is performing its return stroke whereby a uniform consumption of power is attained, an automatic feed mechanism for imparting to each tool ram a uniform feed motion in a radial direction with regard to the blank, a dividing device for automatically turning the rotary table together with the blank around its axis by an angular amount corresponding to the pitch of the teeth produced, and an operative connection between the feed mechanism and the dividing device which prevents the dividing device from becoming operative until after the feed mechanism has moved the tools into their initial position out of engagement with the blank.

5. In a gear slotting machine, the combination of a rotary table adapted to hold the blank coaxially to the table, two tool rams arranged diametrically opposite each other with regard to the axis of the blank, a driving shaft, means to convert the rotary motion of the diving shaft into a reciprocating motion of said tool rams and to actuate same alternately so that one ram is performing its working stroke while the other is performing its return stroke whereby a uniform consumption of power is attained, an automatic feed mechanism for imparting to each tool ram a uniform feed motion in a radial direction with regard to the blank, a dividing device for automatically turning the rotary table together with the blank around its axis by an angular amount corresponding to the pitch of the teeth produced, an operative connection between the feed mechanism and the dividing device which prevents the dividing device from becoming operative until after the feed mechanism has moved the tools into their initial position out of engagement with the blank, and means interposed in said operative connection to keep a member actuating the feed mechanism inoperative until after the action of the dividing device is finished.

6. In a gear slotting machine, the combination of a rotary table adapted to hold the blank coaxially to the table, two tool rams arranged diametrically opposite each other with regard to the axis of the blank, a driving shaft, means to convert the rotary motion of the driving shaft into a reciprocating motion of said tool rams and to actuate same alternately so that one ram is performing its working stroke while the other is performing its return stroke whereby a uniform consumption of power is attained, an automatic feed mechanism for imparting to each tool ram a uniform feed motion in a radial direction with regard to the blank, two parallel racks and a common pinion arranged between and co-acting with said racks interposed in said feed mechanism, the two racks being connected to the two tool rams respectively so that upon a turning of the pinion upon the feed mechanism becoming operative the tool rams are moved simultaneously and in opposite directions, and a dividing device for automatically turning the rotary table together with the blank around its axis by an angular amount corresponding to the pitch of the teeth produced.

In testimony that I claim the foregoing as my invention, I have signed my name.

OTTO SCHAERER.